United States Patent
Zhou et al.

(10) Patent No.: US 9,100,821 B2
(45) Date of Patent: Aug. 4, 2015

(54) ANTI-EAVESDROPPING COMMUNICATION SYSTEM AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jian-Jun Zhou, Shenzhen (CN); Jun-Wei Zhang, Shenzhen (CN); Jun Zhang, Shenzhen (CN); Qi-Long Yu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 167 days.

(21) Appl. No.: 13/899,597

(22) Filed: May 22, 2013

(65) Prior Publication Data

US 2014/0045545 A1 Feb. 13, 2014

(30) Foreign Application Priority Data

Aug. 9, 2012 (CN) .......................... 2012 1 0281949

(51) Int. Cl.
| | |
|---|---|
| H04M 1/66 | (2006.01) |
| H04W 12/02 | (2009.01) |
| H04W 12/12 | (2009.01) |
| H04M 1/19 | (2006.01) |
| H04K 1/02 | (2006.01) |
| H04L 29/06 | (2006.01) |

(52) U.S. Cl.
CPC ................ *H04W 12/02* (2013.01); *H04M 1/19* (2013.01); *H04W 12/12* (2013.01); *H04K 1/02* (2013.01); *H04L 63/1475* (2013.01); *H04L 63/1491* (2013.01); *H04L 2209/08* (2013.01)

(58) Field of Classification Search
USPC ....................................... 455/1; 380/255, 270
See application file for complete search history.

(56) References Cited

U.S. PATENT DOCUMENTS

| | | | |
|---|---|---|---|
| 2004/0125922 A1* | 7/2004 | Specht ........................ | 379/88.01 |
| 2006/0109983 A1* | 5/2006 | Young et al. .................. | 380/252 |
| 2006/0115080 A1* | 6/2006 | Gabara et al. .................. | 380/39 |
| 2011/0268291 A1* | 11/2011 | Ha ................................. | 381/74 |
| 2013/0316686 A1* | 11/2013 | Subbaramoo et al. ........ | 455/418 |

\* cited by examiner

*Primary Examiner* — Daniel Lai
(74) *Attorney, Agent, or Firm* — Novak Druce Connolly Bove + Quigg LLP

(57) ABSTRACT

An anti-eavesdropping communication system and method are adapted to be applied in a mobile phone. The mobile phone defines a normal call mode and an anti-eavesdropping call mode. When a user of the mobile phone has a phone conversation using an earphone in the anti-eavesdropping call mode, the system plays a preset audio file which is a recording of the voice of the user saying unimportant things. From the position of a bystander, the recording of the voice of the user interferes with the clarity of what the user is actually saying, and prevents people beside the user overhearing or eavesdropping on the actual conversation which is taking place.

18 Claims, 6 Drawing Sheets

ANTI-EAVESDROPPING COMMUNICATION SYSTEM AND METHOD

BACKGROUND

1. Technical Field

The disclosure generally relates to communication systems, particularly to an anti-eavesdropping communication system and an anti-eavesdropping communication method adapted for the system based on a mobile phone.

2. Description of Related Art

When a user of a mobile phone makes a call, people beside the user may easily overhear the content of the conversation. If such overhearing is intentional, it amounts to eavesdropping.

Therefore, what is needed is a system and a method to overcome the described problems.

DETAILED DESCRIPTION

Figure 1:
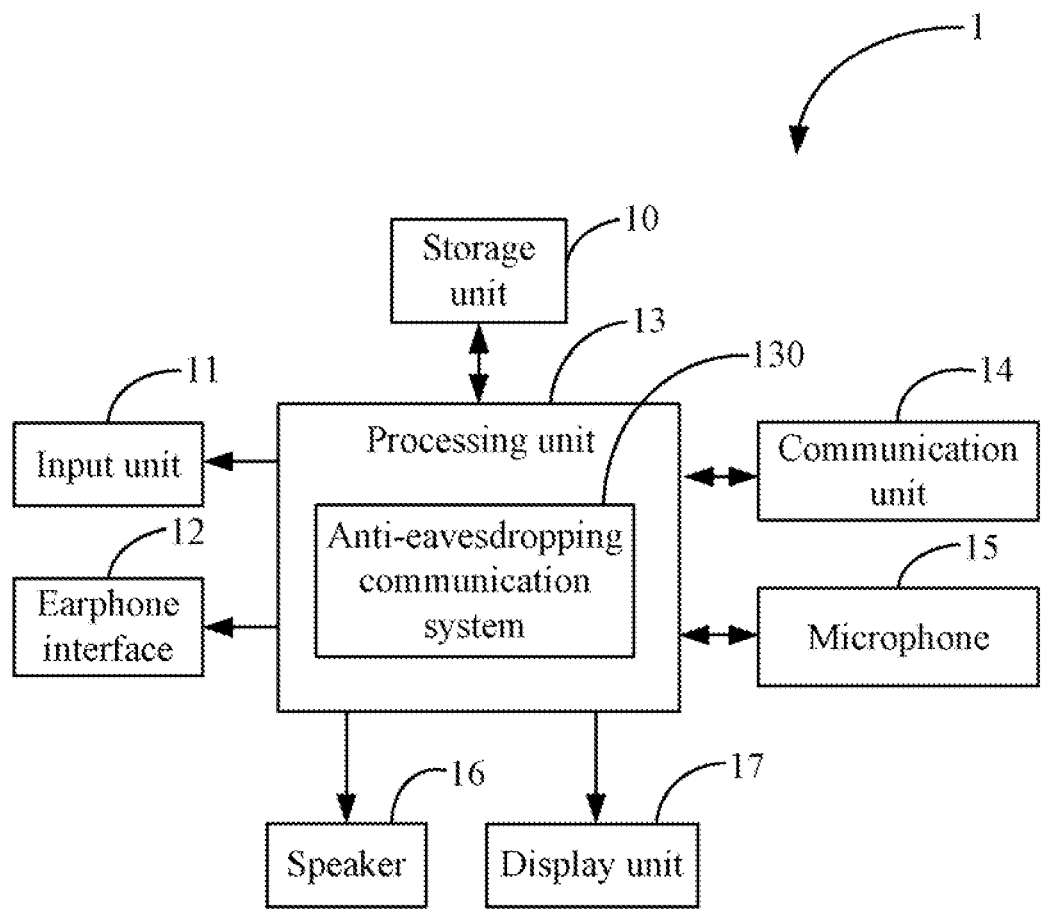
FIG. 1 is a block diagram of a mobile phone including an anti-eavesdropping communication system in accordance with an exemplary embodiment of the present invention.

FIG. 1 is a block diagram of a mobile phone including an anti-eavesdropping communication system in accordance with an exemplary embodiment. It will be appreciated that the anti-eavesdropping communication system likewise functions as an anti-overhearing communication system. For simplicity, unless the context indicates otherwise, the system described below is referred to as an "anti-eavesdropping communication system."

The mobile phone 1 includes a storage unit 10, an input unit 11, an earphone interface 12, a processing unit 13, a communication unit 14, a microphone 15, a speaker 16, and a display unit 17. The storage unit 10 stores data, such as a preset audio file. The input unit 11 generates signals in response to user inputs. The earphone interface 12 is for connection to an earphone. In the following description, an earphone set 2 (hereinafter "earphone 2"—see FIG. 2) is used as an example. The processing unit 13 controls the working of the mobile phone 1. The communication unit 14 communicates with a wireless communication system (not shown). The microphone 15 receives sound from a user of the mobile phone 1. The speaker 16 outputs sound. The display unit 17 displays information.

Figure 2:
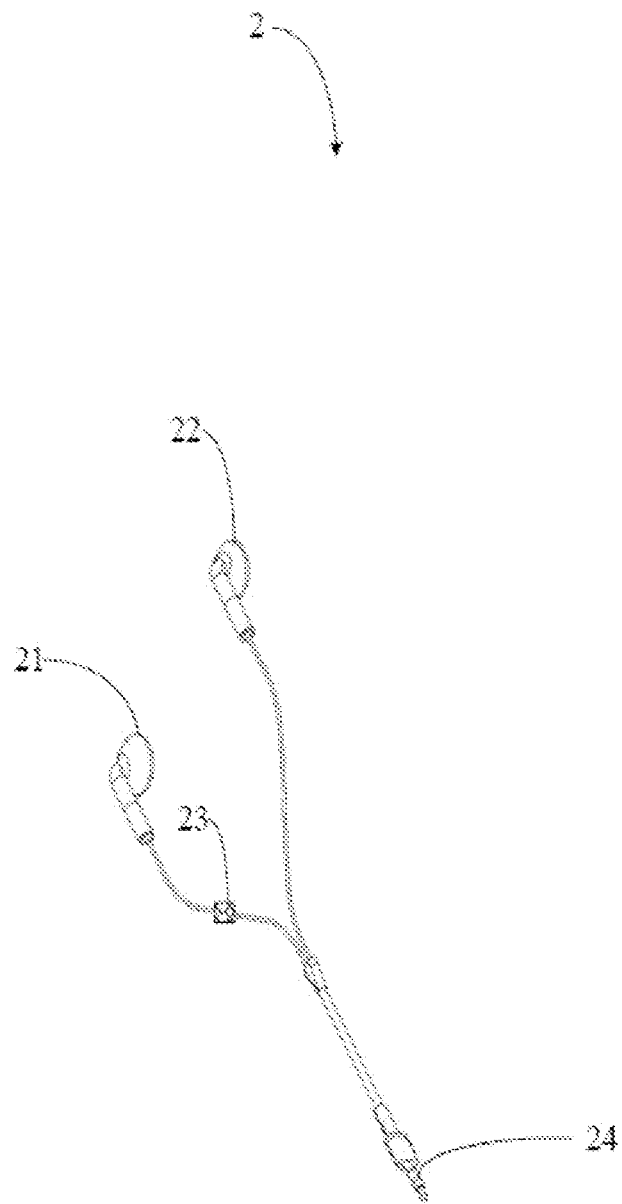
FIG. 2 is an isometric view of an earphone set used with the mobile phone of FIG. 1.

As shown in FIG. 2, the earphone 2 includes two earplugs 21, 22, a microphone 23, and a plug 24. When the plug 24 is connected to the earphone interface 12 of the mobile phone 1 and the two earplugs 21, 22 are placed in the ears of a user, the user can have a phone conversation using the earphone 2. When a user is communicating with another party by the mobile phone 1, the two earplugs 21, 22 receive speech from the other party and the microphone 23 receives speech from the user. A distance between the microphone 23 of the earphone 2 and the speaker 16 is long enough to avoid unwanted audio feedback.

Figure 3:
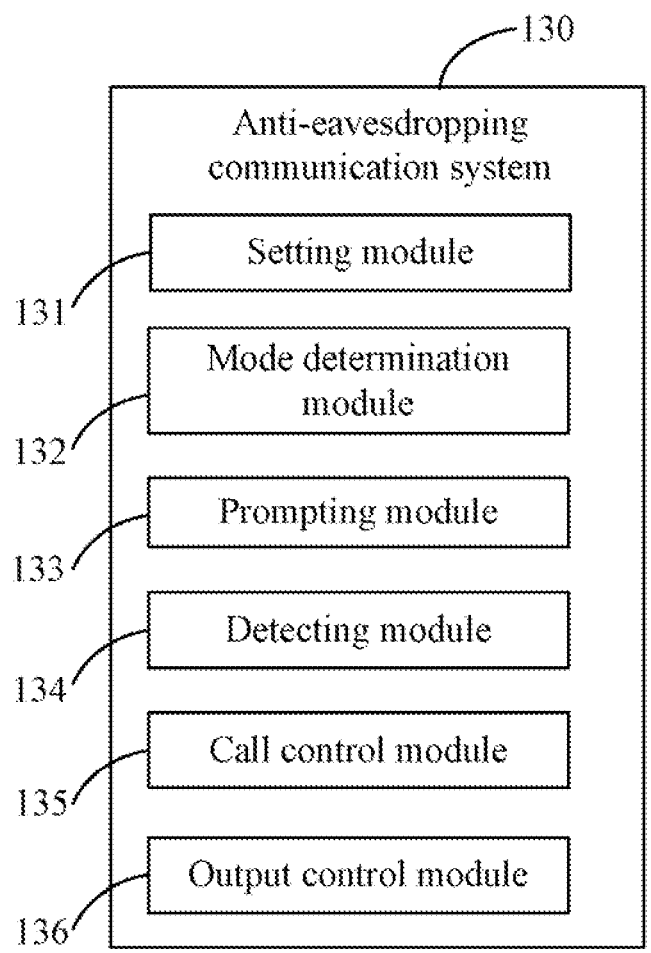
FIG. 3 is a block diagram of the anti-eavesdropping communication system of FIG. 1.

The processing unit 13 includes an anti-eavesdropping communication system 130. As shown in FIG. 3, the anti-eavesdropping communication system 130 further includes a setting module 131, a mode determination module 132, a prompting module 133, a detecting module 134, a call control module 135, and an output control module 136.

Figure 4:
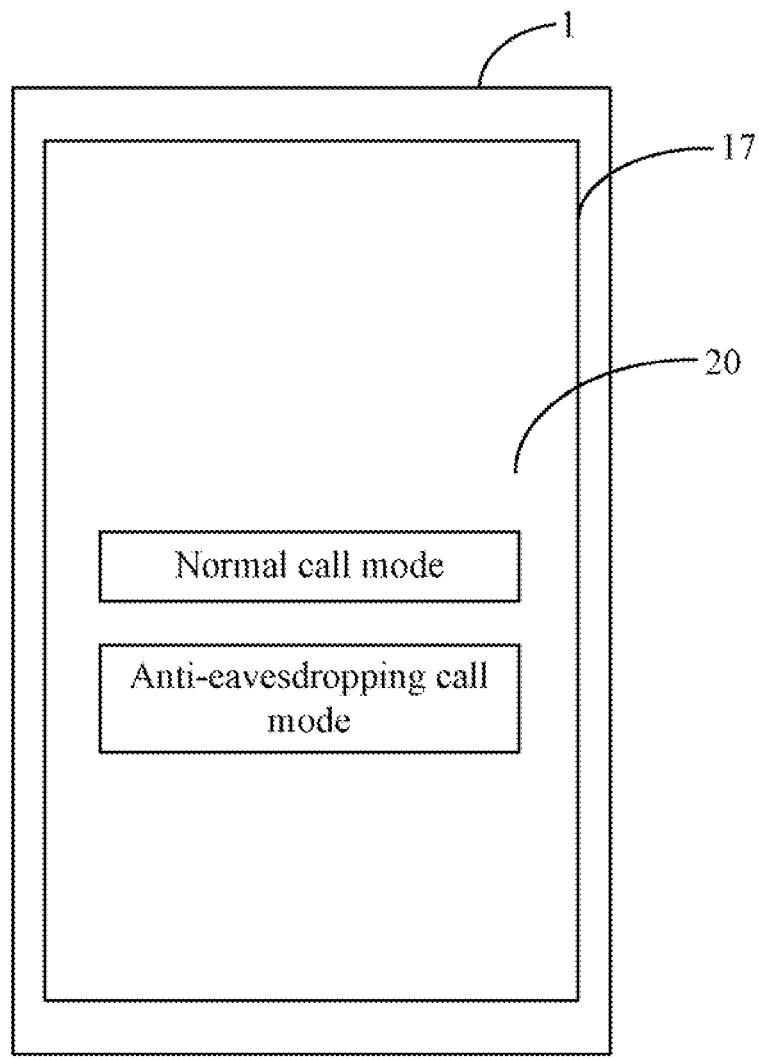
FIG. 4 is a schematic front plan view of the mobile phone of the exemplary embodiment, showing a mode selecting interface thereof.

As shown in FIG. 4, the setting module 131 defines a mode selecting interface 20, and sets an anti-eavesdropping call mode in the mode selecting interface 20 displayed on the display unit 17. The mode selecting interface 20 includes at least two call modes, such as an anti-eavesdropping call mode and a normal call mode. Either the anti-eavesdropping call mode or the normal call mode can be selected by the user input into the input unit 11. The normal call mode is set as a default for the mobile phone 1, thus employing a conventional communication method. For example, when the mobile phone 1 establishes a call link, a receiver (not shown) of the mobile phone 1 receives audio signals from another party, and the microphone 15 receives speech from the user.

Figure 5:
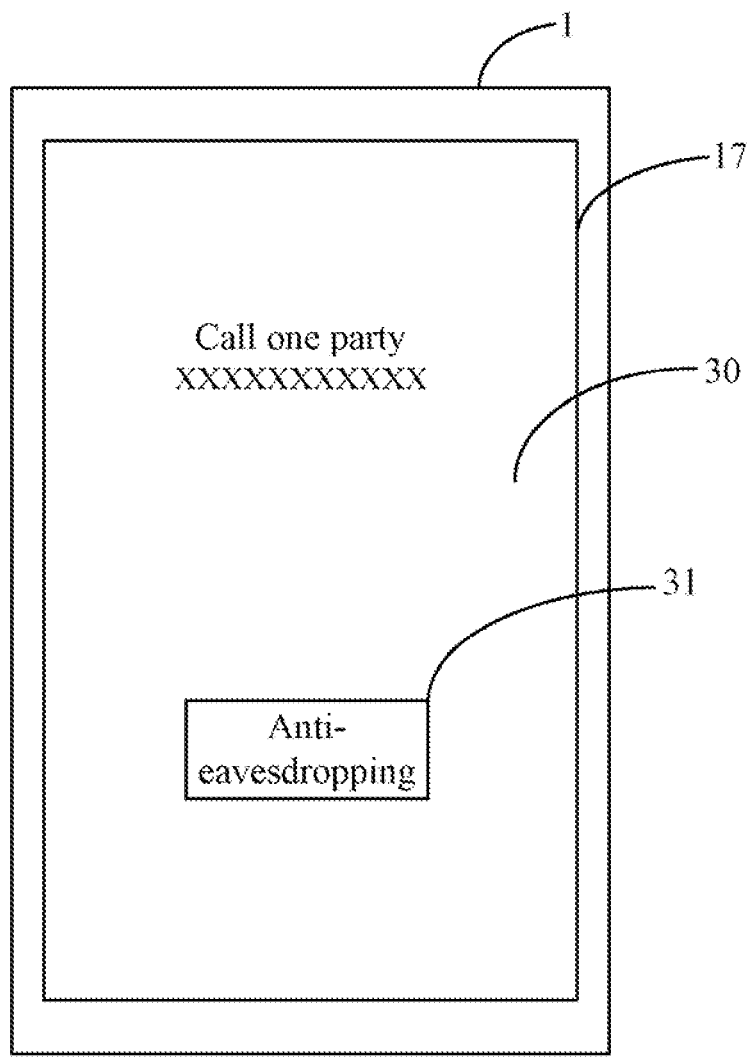
FIG. 5 is similar to FIG. 4, but showing a call interface of the mobile phone.

When a user communicates with another party by the mobile phone 1, the communication unit 14 receives an incoming call or an outgoing call is made via the communication unit 14. The mode determination module 132 detects a current call mode of the mobile phone 1, and determines whether or not the current call mode is the anti-eavesdropping call mode. When the current call mode is not the anti-eavesdropping call mode, the prompting module 133 generates a call interface 30 associated with the anti-eavesdropping call mode on the display unit 17, as shown in FIG. 5. In particular, when the communication unit 14 is used for an outgoing call, the call interface 30 includes call information "call one party" and shows an icon 31 associated with the anti-eavesdropping call mode.

The mode determination module 132 further determines whether or not the anti-eavesdropping call mode associated with the icon 31 is activated by the user. When the anti-eavesdropping call mode is activated in response to user input, it is determined that the anti-eavesdropping call mode is selected. When the anti-eavesdropping call mode is not activated within a preset time period, such as five seconds, the call control module 135 establishes a call link based on the normal call mode, and the user has a phone conversation as normal via the receiver and the microphone 15 of the mobile phone 1.

When the current call mode is the anti-eavesdropping call mode or the anti-eavesdropping call mode is activated, the detecting module 134 detects whether or not the mobile phone 1 is connected to the earphone 2, by determining whether or not the plug 24 of the earphone 2 is inserted into the earphone interface 12 of the mobile phone 1. If the mobile phone 1 is not connected to the earphone 2, the call control module 135 establishes a call link based on the normal call mode. If the mobile phone 1 is connected to the earphone 2, the call control module 135 establishes a call link based on the anti-eavesdropping call mode, and controls the earphone 2 to enable communication with the other party, it is determined that the earphone 2 receives speech from the user of the mobile phone 1 and audio signals from the other party; and the output control module 136 controls the speaker 16 to play the preset audio file in the storage unit 10. In the embodiment, the preset audio file is a recording of the voice of the user of the mobile phone 1 saying unimportant things.

Thus, when the speaker 16 plays the preset audio file, people beside the user cannot clearly hear what the user is actually saying as the voice recording played by the speaker 16 effectively provides audible interference.

Figure 6:
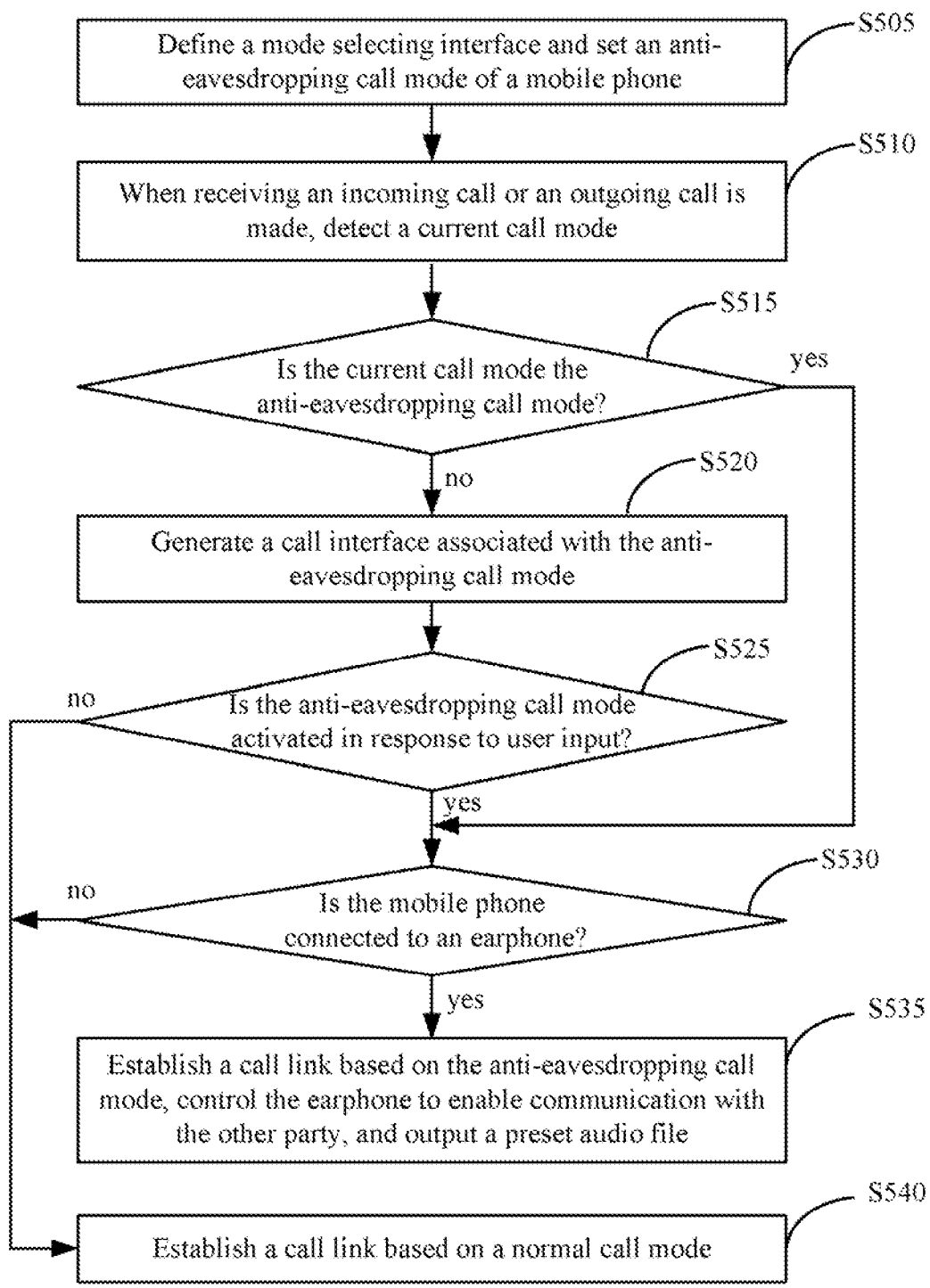
FIG. 6 is a flowchart illustrating an anti-eavesdropping communication method in accordance with an exemplary embodiment of the present invention.

FIG. 6 is a flowchart illustrating an anti-eavesdropping communication method in accordance with an exemplary embodiment. It will be appreciated that the anti-eavesdropping communication method likewise functions as an anti-overhearing communication method. For simplicity, unless the context indicates otherwise, the method described below is referred to as an "anti-eavesdropping communication method."

In a first embodiment, in step S505, the setting module 131 defines a mode selecting interface 20, and sets an anti-eavesdropping call mode in the mode selecting interface 20 on the display unit 17.

In step S510, when the communication unit 14 receives an incoming call or an outgoing call is made, the mode determination module 132 detects a current call mode of the mobile phone 1.

In step S515, the mode determination module 132 determines whether or not the current call mode is the anti-eavesdropping call mode.

In step S520, if the current call mode is not the anti-eavesdropping call mode, the prompting module 133 generates the call interface 30 associated with the anti-eavesdropping call mode on the display unit 17.

In step S525, the mode determination module 132 further determines whether or not the anti-eavesdropping call mode on the call interface 30 is activated in response to user input through the input unit 11.

In step S530, if the current call mode is the anti-eavesdropping call mode or if the anti-eavesdropping call mode on the call interface 30 is activated, the detecting module 134 detects whether or not the mobile phone 1 is connected to the earphone 2.

In step S535, if the mobile phone 1 is connected to the earphone 2, the call control module 135 establishes a call link based on the anti-eavesdropping call mode, controls the earphone 2 to communicate with the other party, and the output control module 136 controls the speaker 16 to play the preset audio file in the storage unit 10.

In step S540, if the mobile phone 1 is not connected to the earphone 2 or if the anti-eavesdropping call mode on the call interface 30 is not activated, the call control module 135 establishes a call link based on the normal call mode.

In the first embodiment, the anti-eavesdropping communication system 130 firstly detects the current call mode of the mobile phone 1 and then determines whether or not the mobile phone 1 is connected to the earphone 2. In a second embodiment, the anti-eavesdropping communication system 130 firstly determines whether or not the mobile phone 1 is connected to the earphone 2 and then detects the current call mode of the mobile phone 1. In a third embodiment, the anti-eavesdropping communication system 130 only determines whether or not the mobile phone 1 is connected to the earphone 2.

In the second embodiment, when the communication unit 14 receives an incoming call or an outgoing call is made, the detecting module 134 firstly detects whether or not the mobile phone 1 is connected to the earphone 2. If the mobile phone 1 is connected to the earphone 2, the mode determination module 132 determines whether or not the current call mode is the anti-eavesdropping call mode. If the current call mode is not the anti-eavesdropping call mode, the prompting module 133 generates a call interface 30 associated with the anti-eavesdropping call mode on the display unit 17. The mode determination module 132 further determines whether or not the anti-eavesdropping call mode on the call interface 30 is activated in response to user input through the input unit 11.

If the current call mode is the anti-eavesdropping call mode or if the anti-eavesdropping call mode on the call interface 30 is activated, the call control module 135 establishes a call link based on the anti-eavesdropping call mode, and controls the earphone 2 to enable communication with the other party; and the output control module 136 controls the speaker 16 to play the preset audio file in the storage unit 10. If the mobile phone 1 is not connected to the earphone 2 or if the anti-eavesdropping call mode on the call interface 30 is not activated, the call control module 135 establishes a call link based on the normal call mode.

In the third embodiment, when the communication unit 14 receives an incoming call or an outgoing call is made, the detecting module 134 detects whether or not the mobile phone 1 is connected to the earphone 2. If the mobile phone 1 is connected to the earphone 2, the call control module 135 establishes a call link based on the anti-eavesdropping call mode, and controls the earphone 2 to enable communication with the other party; and the output control module 136 controls the speaker 16 to play the preset audio file in the storage unit 10. If the mobile phone 1 is not connected to the earphone 2, the call control module 135 establishes a call link based on the normal call mode.

It is to be understood, however, that even though numerous characteristics and advantages of exemplary embodiments have been set forth in the foregoing description, together with details of the structures and functions of the exemplary embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An anti-eavesdropping communication system adapted to be applied in a mobile phone, the mobile phone comprising at least one processor and storing a preset audio file, the anti-eavesdropping communication system comprising:
   a mode determination module configured to detect a current call mode of the mobile phone and determine whether or not the current call mode is an anti-eavesdropping call mode of the mobile phone when the mobile phone receives an incoming call or an outgoing call is made from the mobile phone;
   a detecting module configured to detect whether or not the mobile phone is connected to an earphone when the current call mode is the anti-eavesdropping call mode; and
   a call control module configured to establish a call link based on a normal call mode of the mobile phone when the mobile phone is not connected to the earphone; and configured to establish a call link based on the anti-eavesdropping call mode, control the earphone to enable communication with the other party, and control the mobile phone to play the preset audio file when the mobile phone is connected to the earphone;
   wherein the mode determination module, the detecting module, and the call control module are executable by the at least one processor.

2. The anti-eavesdropping communication system of claim 1, wherein the mobile phone comprises a speaker, the earphone comprises a microphone, and a distance between the microphone and the speaker is long enough to avoid audio feedback.

3. The anti-eavesdropping communication system of claim 1, further comprising:
   a setting module configured to define a mode selecting interface and set the anti-eavesdropping call mode on the mode selecting interface;
   wherein the setting module is executable by the at least one processor.

4. The anti-eavesdropping communication system of claim 1, wherein the normal call mode is set as a default mode of the mobile phone.

5. The anti-eavesdropping communication system of claim 1, further comprising:
   a prompting module configured to generate a call interface associated with the anti-eavesdropping call mode when the current call mode is not the anti-eavesdropping call mode;
   wherein the prompting module is executable by the at least one processor.

6. The anti-eavesdropping communication system of claim 5, wherein the mode determination module is further configured to determine whether or not the anti-eavesdropping call mode on the call interface is activated in response to user input; and when the anti-eavesdropping call mode on the call interface is not activated, the call control module is further configured to establish a call link based on the normal call mode.

7. The anti-eavesdropping communication system of claim 1, wherein the preset audio file is a recording of the voice of the user of the mobile phone saying unimportant things.

8. An anti-eavesdropping communication method applied in a mobile phone, the mobile phone storing a preset audio file, the method comprising:
   when the mobile phone receives an incoming call or an outgoing call is made from the mobile phone, detecting a current call mode of the mobile phone and determining whether or not the current call mode is an anti-eavesdropping call mode of the mobile phone;
   when the current call mode is the anti-eavesdropping call mode, detecting whether or not the mobile phone is connected to an earphone;
   when the mobile phone is not connected to an earphone in the anti-eavesdropping call mode, establishing a call link based on a normal call mode of the mobile phone; and
   when the mobile phone is connected to an earphone in the anti-eavesdropping call mode, establishing a call link based on the anti-eavesdropping call mode, controlling the earphone to enable communication with the other party, and controlling the mobile phone to play the preset audio file.

9. The method of claim 8, further comprising:
   defining a mode selecting interface and setting the anti-eavesdropping call mode on the mode selecting interface.

10. The method of claim 8, wherein the normal call mode is set as a default mode of the mobile phone.

11. The method of claim 8, further comprising:
   when the current call mode is not the anti-eavesdropping call mode, generating a call interface associated with the anti-eavesdropping call mode.

12. The method of claim 11, further comprising:
   determining whether the anti-eavesdropping call mode on the call interface is activated in response to user input; and
   when the anti-eavesdropping call mode on the call interface is not activated, establishing a call link based on the normal call mode.

13. The method of claim 8, wherein the preset audio file is a recording of the voice of the user of the mobile phone saying unimportant things.

14. An anti-eavesdropping communication system adapted to be applied in a mobile phone, the mobile phone comprising at least one processor and storing a preset audio file, the anti-eavesdropping communication system comprising:
   a detecting module configured to detect whether or not the mobile phone is connected to an earphone when a user of the mobile phone communicates with another party by the mobile phone; and
   a call control module configured to establish a call link and control the mobile phone to receive speech from the user and sound signals from another party when the mobile phone is not connected to the earphone; and configured to establish a call link, control the earphone to enable communication with the other party, and control the mobile phone to play the preset audio file when the mobile phone is connected to the earphone;
   wherein the detecting module and the call control module are executable by the at least one processor.

15. The anti-eavesdropping communication system of claim 14, wherein the mobile phone comprises a speaker, the earphone comprises a microphone, and a distance between the microphone and the speaker is long enough to avoid audio feedback.

16. The anti-eavesdropping communication system of claim 14, further comprising:
   a mode determination module to detect a current call mode and determine whether or not the current call mode is an anti-eavesdropping call mode when the mobile phone is connected to the earphone; and
   a prompting module to generate a call interface associated with the anti-eavesdropping call mode when the current call mode is not the anti-eavesdropping call mode;
   wherein the call control module is configured to establish the call link, control the earphone to enable communication with the other party, and control the mobile phone to play the preset audio file when the current call mode is the anti-eavesdropping call mode; and
   the mode determination module and the prompting module are also executable by the at least one processor.

17. The anti-eavesdropping communication system of claim 16, wherein the mode determination module is further configured to determine whether or not the anti-eavesdropping call mode on the call interface is activated in response to user input, when the anti-eavesdropping call mode is not activated, the call control module is further configured to establish a call link based on an normal call mode; when the anti-eavesdropping call mode is activated, the call control module is configured to establish the call link, control the earphone to enable communication with the other party, and control the mobile phone to play the preset audio file.

18. The anti-eavesdropping communication system of claim 14, wherein the preset audio file is a recording of the voice of the user of the mobile phone saying unimportant things.

* * * * *